(12) United States Patent
Berry et al.

(10) Patent No.: US 11,364,829 B2
(45) Date of Patent: Jun. 21, 2022

(54) SEATBACK CARRIER WITH DEPLOYMENT HINGE POINTS

(71) Applicant: Ford Global Technologies, LLC, Dearborn, MI (US)

(72) Inventors: S. M. Akbar Berry, Windsor (CA); Johnathan Andrew Line, Northville, MI (US); Alan George Dry, Grosse Pointe Woods, MI (US); Marcos Silva Kondrad, Macomb Township, MI (US); Benjamin Yilma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 16/594,132

(22) Filed: Oct. 7, 2019

(65) Prior Publication Data

US 2021/0101511 A1 Apr. 8, 2021

(51) Int. Cl.
*B60N 2/68* (2006.01)
*B60R 21/207* (2006.01)

(52) U.S. Cl.
CPC ............ *B60N 2/682* (2013.01); *B60R 21/207* (2013.01)

(58) Field of Classification Search
None
See application file for complete search history.

(56) References Cited

U.S. PATENT DOCUMENTS

| 5,458,365 | A | 10/1995 | Rogers et al. |
| 5,547,214 | A | 8/1996 | Simmerman, II et al. |
| 6,217,062 | B1 * | 4/2001 | Breyvogel ............... B60N 2/68 |
| | | | 280/728.2 |
| 7,347,444 | B2 | 3/2008 | Wheelwright |
| 8,056,923 | B2 | 11/2011 | Shimono |
| 8,177,256 | B2 | 5/2012 | Smith et al. |
| 8,328,227 | B2 | 12/2012 | Shimono |
| 8,757,715 | B2 * | 6/2014 | Yamaki ................ B60N 2/4235 |
| | | | 297/216.13 |
| 8,807,594 | B2 * | 8/2014 | Mizobata .............. B60R 21/207 |
| | | | 280/730.2 |
| 9,694,779 | B1 * | 7/2017 | Line ...................... B60R 21/216 |
| 9,707,873 | B2 * | 7/2017 | Line ..................... B60N 2/0232 |
| 9,834,166 | B1 * | 12/2017 | Line .................. B60R 21/23138 |
| 9,840,173 | B2 * | 12/2017 | Murthy .................. B60N 2/682 |
| 9,932,012 | B1 * | 4/2018 | Line ..................... B60N 2/5825 |

(Continued)

FOREIGN PATENT DOCUMENTS

| WO | 9534449 | 12/1995 |
| WO | 2013070905 A1 | 5/2013 |

*Primary Examiner* — Faye M Fleming
(74) *Attorney, Agent, or Firm* — Vichit Chea; Price Heneveld LLP

(57) ABSTRACT

A seatback assembly includes a front carrier module having a mounting portion with an inverted U-shaped outer perimeter edge. A plurality of doors includes individual doors that are hingedly coupled to the outer perimeter edge of the front carrier module. Each door of the plurality of doors is operable between open and closed positions. An airbag carrier module includes an inverted U-shaped raceway with an open front portion. The airbag carrier module is operably coupled to the front carrier module, such that the doors of the front carrier module selectively open and close the open front portion of the raceway of the airbag carrier module.

19 Claims, 13 Drawing Sheets

(56) References Cited

U.S. PATENT DOCUMENTS

| | | | |
|---|---|---|---|
| 10,933,784 B2* | 3/2021 | Yilma | B60N 2/6009 |
| 2011/0121624 A1* | 5/2011 | Brncick | B60N 2/6673 |
| | | | 297/284.2 |
| 2013/0320742 A1* | 12/2013 | Murolo | B60N 2/682 |
| | | | 297/452.18 |
| 2014/0070594 A1* | 3/2014 | Awata | B60N 2/986 |
| | | | 297/452.48 |
| 2016/0009209 A1* | 1/2016 | Cao | B60N 2/4249 |
| | | | 297/354.12 |
| 2019/0225180 A1* | 7/2019 | Kondrad | B60R 21/207 |
| 2020/0114858 A1* | 4/2020 | Henriksson | B60R 21/207 |
| 2020/0139916 A1* | 5/2020 | Nagai | B60R 21/207 |
| 2021/0009068 A1* | 1/2021 | Farooq | B60R 21/264 |

* cited by examiner

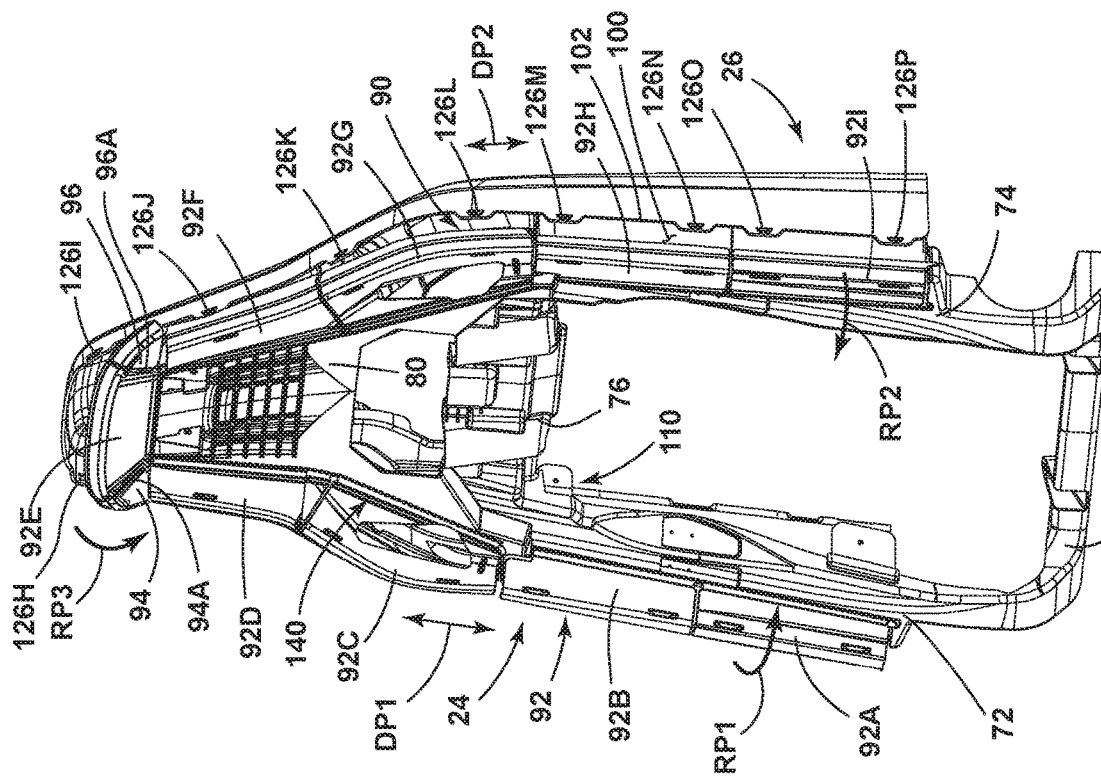

SEATBACK CARRIER WITH DEPLOYMENT HINGE POINTS

FIELD OF THE INVENTION

The present invention generally relates to a seat assembly, and more particularly, to a seat assembly having an airbag assembly that is deployed around a seat occupant from a seatback carrier.

BACKGROUND OF THE INVENTION

An overhead airbag assembly deployed from a seatback carrier must include provisions for the airbag to deploy and surround a seat occupant in a consistent manner. A seatback carrier is desired having integrated hinged portions that allow for an airbag assembly to deploy along an outer perimeter of the seatback carrier.

SUMMARY OF THE INVENTION

According to one aspect of the present invention, a seatback assembly includes a front carrier module having a mounting portion with an inverted U-shaped outer perimeter edge and a plurality of doors hingedly coupled to the outer perimeter edge. Each door of the plurality of doors is operable between open and closed positions. An airbag carrier module includes an inverted U-shaped raceway with an open front portion. The doors of the plurality of doors selectively open and close the open front portion of the raceway of the airbag carrier module.

According to another aspect of the present invention, a front carrier module for a seatback assembly includes a first side member having at least one door hingedly coupled to an outer perimeter edge of the first side member. The at least one door of the first side member is operable between open and closed positions relative to the first side member. A second side member is spaced-apart from the first side member and includes at least one door hingedly coupled to an outer perimeter edge of the second side member. The at least one door of the second side member is operable between open and closed positions relative to the second side member. A support member is positioned above and operably coupled to both the first and second side members. The support member includes an outer perimeter edge having first and second side edges and an upper edge. The support member includes at least one door hingedly coupled to the upper edge of the outer perimeter edge of the support member.

According to another aspect of the present invention, a seatback assembly includes a front carrier module having a mounting portion with an outer perimeter edge and a plurality of doors hingedly coupled to and outwardly extending from the outer perimeter edge of the mounting portion. Each door of the plurality of doors is independently operable between open and closed positions. Each door of the plurality of doors includes an engagement member. An airbag carrier module includes a mounting portion with an outer perimeter edge and a raceway disposed along and outwardly extending from the outer perimeter edge of the mounting portion of the airbag carrier module. The raceway includes a front edge having a plurality of engagement members. At least one engagement member of the plurality of engagement members of the raceway releasably engages an associated engagement member of each door of the plurality of doors of the front carrier module to releasably retain each door of the plurality of doors of the front carrier module in a closed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is a front perspective view of the front carrier module and airbag carrier module of FIG. 7 showing a plurality of doors in the closed position;

FIG. 10 is a front perspective view of the front carrier module of FIG. 9 showing the plurality of doors in the open position;

DETAILED DESCRIPTION OF THE PREFERRED EMBODIMENTS

Figure 1:
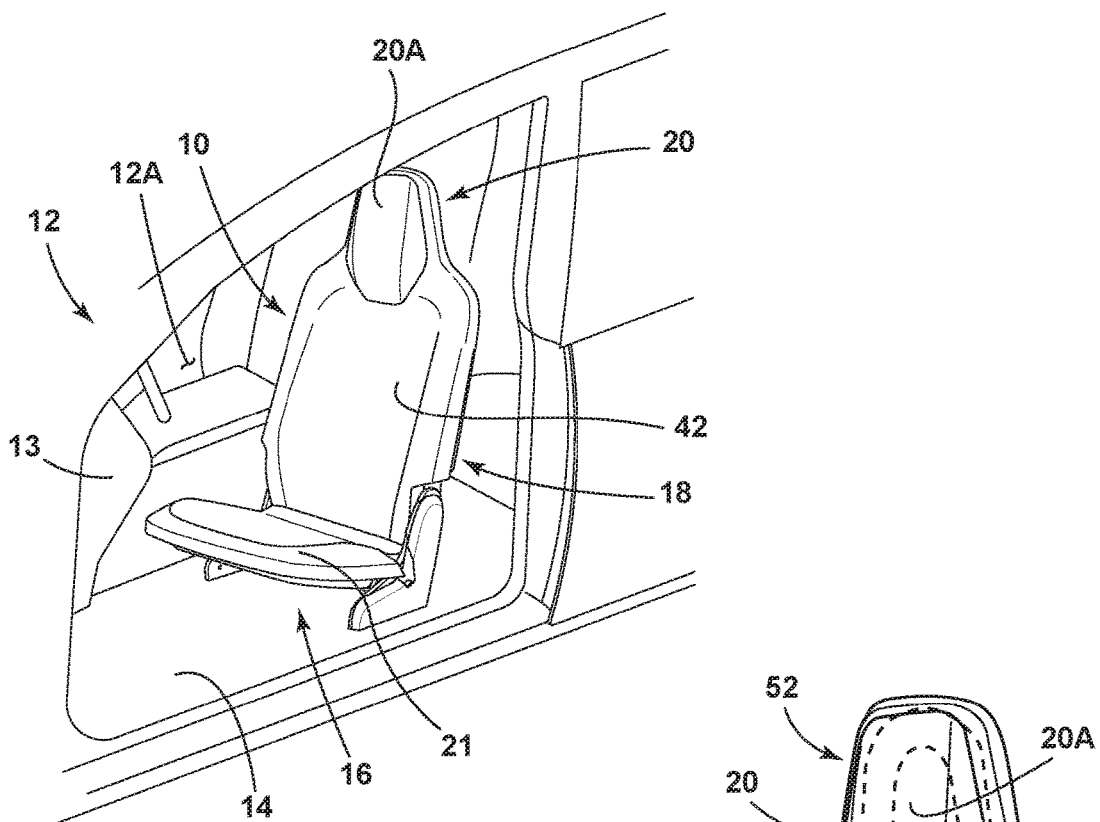
FIG. 1 is a front perspective view of a seat assembly positioned within a vehicle interior.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback assembly 18. It is contemplated that the seat assembly 10 may be configured to rotate within the vehicle interior 12A between forward-facing and rearward-facing configurations. As such, it is contemplated that the vehicle 12 may be an autonomous or self-driving vehicle, in which a seat assembly having forward-facing and rearward-facing capabilities could be used.

Figure 2:
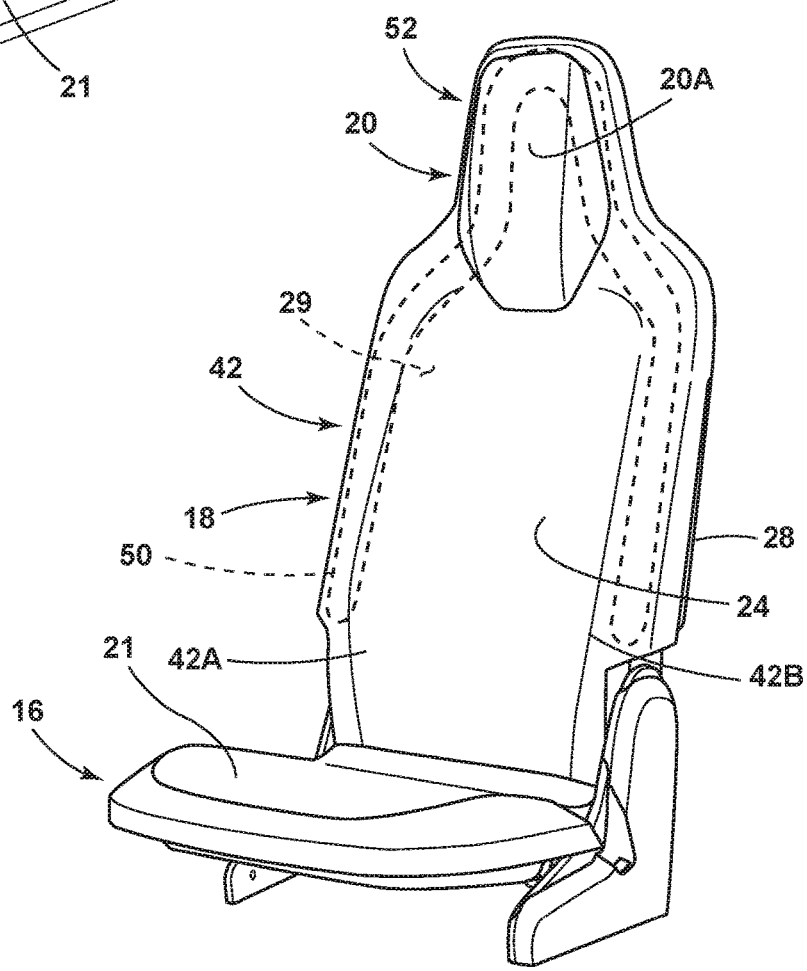
FIG. 2 is a front perspective view of the seat assembly of FIG. 1 as removed from the vehicle and showing an overhead airbag assembly in phantom.

As shown in FIGS. 1 and 2, a headrest assembly 20 is disposed on an upper portion of the seatback assembly 18 and includes a forwardly extending headrest bun 20A. The headrest assembly 20 and the seatback assembly 18 may be integrated components or modular components coupled to one another. As further shown in FIG. 1, the seat portion 16 includes an upper support surface 21 configured to support a seat occupant thereon. Further, the seatback assembly 18 includes a back support portion 42 that is centrally disposed on the seatback assembly 18.

With specific reference to FIG. 2, the back support portion 42 is contemplated to include various support materials, such as cloth and foam materials, packaged on an exterior comfort carrier module, or front carrier module 24, to support the back of a seat occupant seated on the seat assembly 10. The back support portion 42 of the seatback assembly 18 includes opposed sides 42A, 42B that are spaced-apart from one another. As further shown in FIG. 2, the headrest assembly 20 is disposed above the back support portion 42 of the seatback assembly 18 at a headrest support portion 52 that may be an integrated feature of the front carrier module 24. In assembly, the front carrier module 24 is coupled to a back panel 28 around a seatback frame 30 (FIG. 3) in a partially detachable manner, as further described below. The coupling of the front carrier module 24 and the back panel 28 defines an interior portion 29 of the seatback assembly 18 disposed between the front carrier module 24 and the back panel 28. The seatback frame 30 (FIG. 3) is disposed within the interior portion 29 of the seatback assembly 18.

Figure 11A:
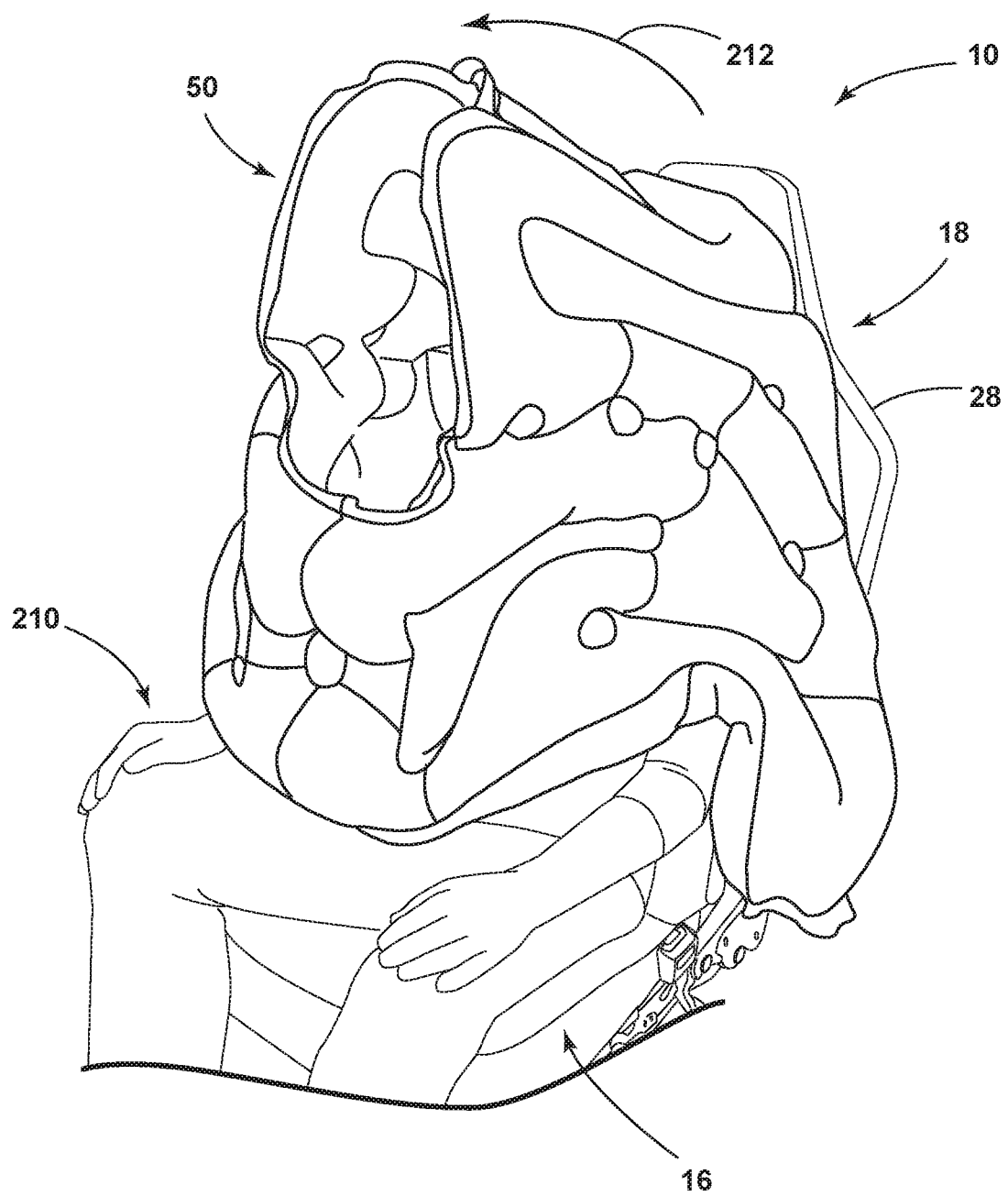
FIG. 11A is a front perspective view of a seat occupant seated in the seat assembly of FIG. 2 with an overhead airbag assembly shown in a deployed position.
Figure 11B:
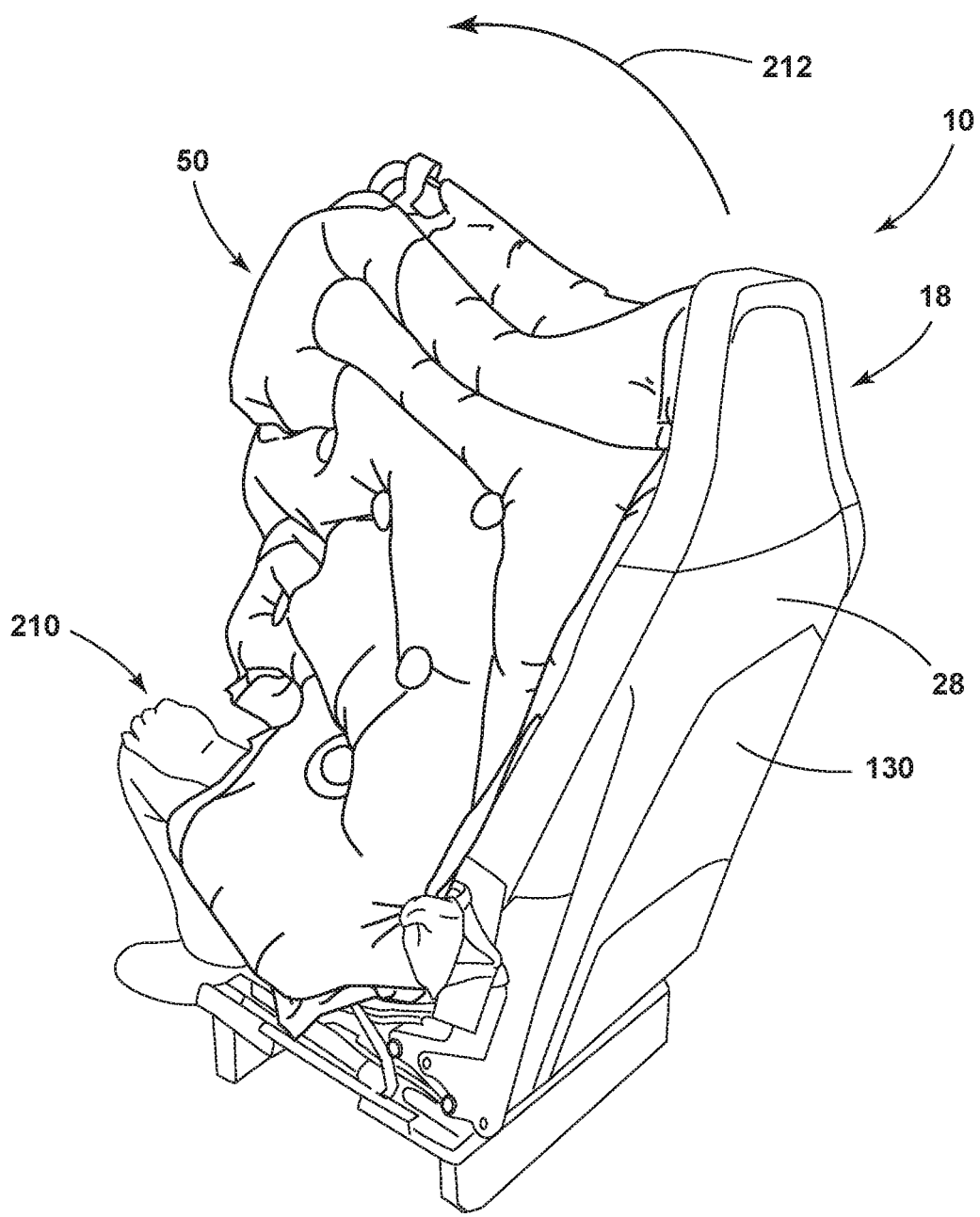
FIG. 11B is a rear perspective view of the seat assembly and seat occupant of FIG. 11A.

As further shown in FIG. 2, the seat assembly 10 includes an airbag assembly 50 disposed within the interior portion 29 of the seatback assembly 18. The airbag assembly 50 is operable between deployed and stowed positions. In FIG. 2, the airbag assembly 50 is shown in phantom in the stowed position, in which the airbag assembly 50 is supported and contained within the interior portion 29 of the seatback assembly 18. The airbag assembly 50 is configured to deploy from the stowed position to a deployed position in a seat-forward direction around the back support portion 42 of the seatback assembly 18, as shown in FIGS. 11A and 11B. The airbag assembly 50 is disposed along the opposed sides 42A, 42B of the back support portion 42 of the seatback assembly 18, and is further disposed around an outer perimeter of the headrest assembly 20 of the seatback assembly 18 in the stowed position. In this way, the airbag assembly 50 is an overhead airbag assembly that is configured to outwardly deploy to surround a seat occupant, much like the airbag assemblies disclosed in U.S. patent application Ser. Nos. 16/370,617 and 16/370,519 entitled SEAT ASSEMBLY WITH FULL SEATBACK AIRBAG filed Mar. 29, 2019, which are hereby incorporated by reference in their entireties.

Figure 3:
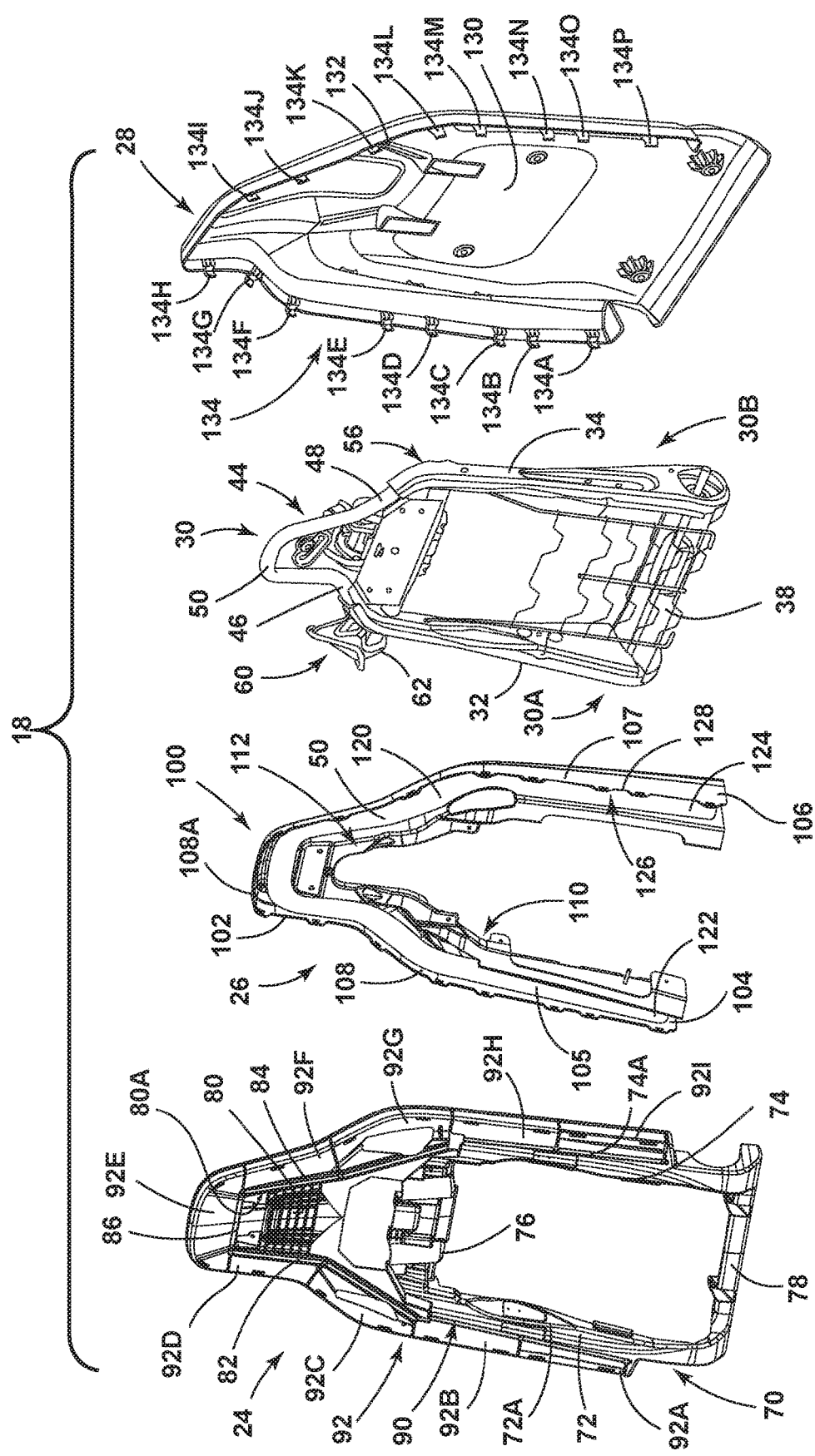
FIG. 3 is an exploded front perspective view of a seatback assembly showing a front carrier module, an airbag carrier module and a back panel exploded away from a seatback frame.

Referring now to FIG. 3, the seatback assembly 18 is shown in an exploded view. In the exploded view of FIG. 3, the front carrier module 24 is shown exploded away from an airbag carrier module 26 which is further exploded away from a front side 30A of the seatback frame 30. The back panel 28 is shown exploded away from the rear side 30B of the seatback frame 30. The seatback frame 30 includes first and second side members 32, 34 which are generally disposed in an upright orientation and spaced-apart from one another. Upper and lower cross-members 36, 38 interconnect the first and second side members 32, 34 of the seatback frame 30 to define a generally centrally disposed window 40 therebetween. The first and second side members 32, 34 are contemplated to be mirror images of one another, such that the description of one side member also describes the other side member in a mirrored configuration. Together, the first and second side members 32, 34 partially define a back support portion 42 of the seatback assembly 18.

As further shown in FIG. 3, an upper frame member 44 includes first and second side portions 46, 48 that interconnect with the first and second side members 32, 34 of the seatback frame 30. The upper frame member 44 further includes an upper portion 45 which interconnects the first and second side portions 46, 48 to partially define the headrest support portion 52 of the seatback assembly 18. Thus, the first and second side portions 46, 48 upwardly extend from the first and second side members 32, 34, of the seatback frame 30, and then interconnect at upper portion 45 to generally define an overall inverted U-shaped configuration for the upper frame member 44.

As further shown in FIG. 3, the first and second side members 32, 34 and the upper frame member 44 cooperate to define an outer perimeter 56 of the seatback frame 30. The outer perimeter 56 of the seatback frame 30 extends around the first side member 32, around and over the upper frame member 44, and around the second side member 34 in a generally inverted U-shaped configuration. Further, the seatback frame 30 also includes an inner edge 58 which is defined by inner portions of the first and second side members 32, 34 and the upper frame member 44. As used herein, the term "inverted U-shaped configuration" is used to describe a structural configuration in which two parallel or substantially parallel side members are interconnected at upper portions thereof by an interconnecting member. The interconnecting member can be a straight member or an upwardly curved member (or portion of a unitary member)

that interconnects the side members. A component of the present disclosure described herein as having an inverted U-shaped configuration or a generally/substantially inverted U-shaped configuration may be comprised of multiple components to define an overall inverted U-shaped configuration, or may be a unitary monolithic part disposed in an inverted U-shaped configuration.

With further reference to FIG. 3, the seatback frame 30 includes a seatbelt retainer 60 having a mounting bracket 62 which is coupled to the first side member 32 of the seatback frame 30 in the embodiment shown in FIG. 3. In the embodiment of FIG. 3, the seatbelt retainer 60 is shown disposed on the first side member 32 of the seatback frame 30, however, it is also contemplated that the seatbelt retainer 60 may be disposed on the second side member 34. As such, it is contemplated that the seatback frame 30 shown in FIG. 3 may be used as a passenger side seat assembly to provide for a crossing seatbelt configuration.

As further shown in FIG. 3, the front carrier module 24 is shown with cushion components and cover materials removed therefrom. As shown, the front carrier module 24 includes first and second side members 72, 74 which are generally disposed in an upright orientation and spaced-apart from one another. Upper and lower cross-members 76, 78 interconnect the first and second side members 72, 74 of the front carrier module 24. The first and second side members 72, 74 are contemplated to be mirror images of one another, such that the description of one side member also describes the other side member in a mirrored configuration. Together, the first and second side members 72, 74 partially define the back support portion 42 of the seatback assembly 18. The front carrier module 24 further includes a support member 80 positioned above and operably coupled to both the first and second side members 72, 74. The support member 80 includes an outer perimeter edge 80A having first and second side edges 82, 84 and an upper edge 86. The support member 80 partially defines the headrest support portion 52 of the seatback assembly 18.

As further shown in FIG. 3, the front carrier module 24 includes a mounting portion 70 with an inverted U-shaped outer perimeter edge 90. The mounting portion 70 is comprised of the first and second side members 72, 74 and the support member 80. The outer perimeter edge 90 of the mounting portion 70 is comprised of outer perimeter edges 72A, 74A of the first and second side members 72, 74 and the outer perimeter edge 80A of the support member 80. As such, the outer perimeter edge 90 of the mounting portion 70 of the front carrier module 24 extends around the entirety of the front carrier module 24 with the exception of the lower cross-member 78. In this way, the outer perimeter edge 90 of the front carrier module 24 includes an inverted U-shaped configuration. In assembly, the mounting portion 70 of the front carrier module 24 is configured to mount to the first and second side members 32, 34 and upper frame member 44 of the seatback frame 30.

As further shown in FIG. 3, a plurality of doors 92 includes individual doors 92A-92I that are hingedly coupled to the outer perimeter edge 90 of the front carrier module 24. In this way, the plurality of doors 92 surrounds the front carrier module 24. Each door 92A-92I of the plurality of doors 92 is independently operable between open and closed positions. Specifically, the doors 92A-92I are configured to pivot between the open and closed positions, as further described below. While the front carrier module 24 of the embodiment of FIG. 3 includes doors 92A-92I, it is contemplated that the front carrier module 24 may include more or less doors to effectively deploy an overhead airbag assembly. As used herein, the term "door" is used to describe a portion of a front carrier module that pivots between open and closed positions to allow for the deployment of an airbag assembly.

With further reference to FIG. 3, the airbag carrier module 26 is shown having an inverted U-shaped raceway 100 with an open front portion 102. In use, the doors 92A-92I of the plurality of doors 92 selectively open and close the open front portion 102 of the raceway 100 when the airbag carrier module 26 is coupled to the front carrier module 24, as further described below. The airbag carrier module 26 includes a mounting portion 110 with an outer perimeter edge 112, wherein the raceway 100 is disposed along and outwardly extending from the outer perimeter edge 112 of the mounting portion 110 of the airbag carrier module 26. In assembly, the mounting portion 110 of the airbag carrier module 26 is configured to mount to the first and second side members 32, 34 and upper frame member 44 of the seatback frame 30. Further, the mounting portion 110 of the airbag carrier module 26 is configured to mount to the mounting portion 70 of the front carrier module 24.

As shown in FIG. 3, the raceway 100 of the airbag carrier module 26 includes a body portion 108 having first and second ends 104, 106 and first and second upwardly extending portions 105, 107 which respectively extend upwardly from first and second ends 104, 106. The body portion 108 of the raceway 100 further includes an upper transverse portion 108A which interconnects the first and second upwardly extending portions 105, 107 of the body portion 108 of the raceway 100. In this way, the raceway 100 is an overhead raceway that allows for the deployment of an overhead airbag assembly.

With further reference to FIG. 3, the airbag assembly 50 is shown disposed within the raceway 100 of the airbag carrier module 26. The airbag assembly 50 is an elongate airbag assembly having first and second ends 122, 124 with a body portion 120 disposed therebetween. As shown in FIG. 3, the first and second ends 122, 124 of the airbag assembly 50 are received in the first and second ends 104, 106 of the raceway 100, respectively. The body portion 120 of the airbag assembly 50 is substantially received along an entirety of the body portion 108 of the raceway 100. The terms "substantial," "substantially," and variations thereof, as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other. In this sense, the airbag assembly 50 is disposed along the raceway 100 and substantially fills the body portion 108 of the raceway 100 from first end 104 to second end 106, including the overhead upper transverse portion 108A. In this way, the airbag assembly 50 includes an inverted U-shaped configuration as stowed within the raceway 100 of the airbag carrier module 26. As further shown in FIG. 3, the airbag carrier module 26 includes a plurality of receiving apertures 126 disposed along a front edge 128 of the raceway 100. The plurality of receiving apertures 126 define associated engagement features for releasably coupling to engagement members (146 FIG. 5B). In use, the plurality of receiving apertures 126 disposed along the front edge 128 of the raceway 100 are engaged to releasably retain the doors 92A-92l of the front carrier module 24 in closed positions, as further described below.

As further shown in FIG. 3, the back panel 28 includes a body portion 130 having a front edge 132. A plurality of clip members 134 includes individual clip members 134A-134P disposed along the front edge 132 of the body portion 130 of the back panel 28. The front carrier module 24 includes a plurality of receiving slots disposed on one or more of the doors 92A-92l of the plurality of doors 92, such that the plurality of clip members 134 are received through the plurality of receiving slots to releasably retain the one or more doors 92A-92l of the plurality of doors 92 in closed positions, as further described below. Thus, the back panel 28 releasably couples to the front carrier module 24 at the plurality of doors 92, and the seatback frame 30 and the airbag carrier module 26 are disposed therebetween in the interior portion 29 (FIG. 2).

Figure 4B:
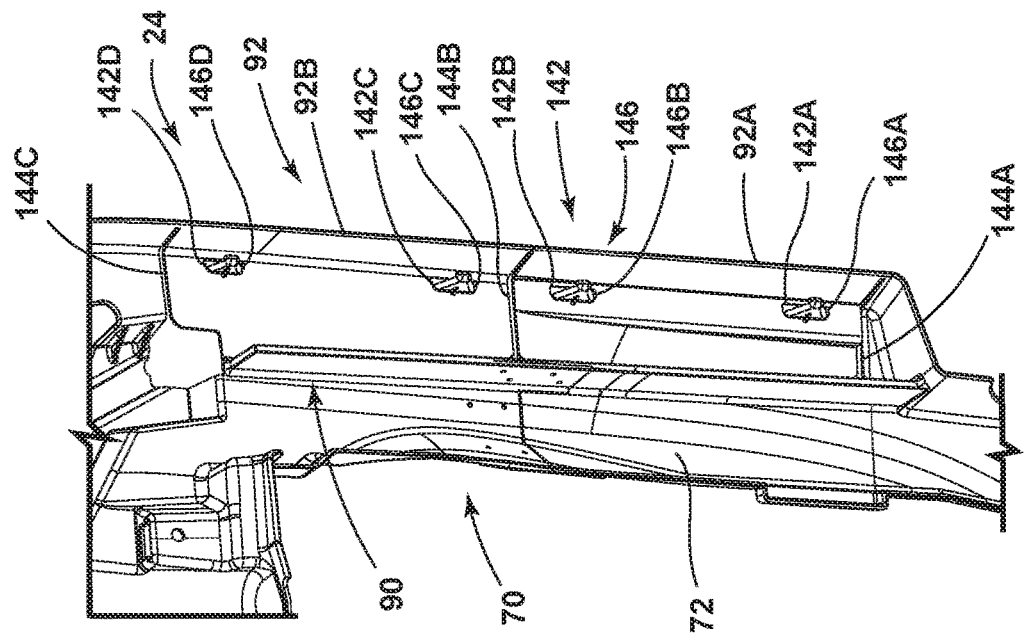
FIG. 4B is a fragmentary rear perspective view of the front carrier module of FIG. 4A.
Figure 4A:
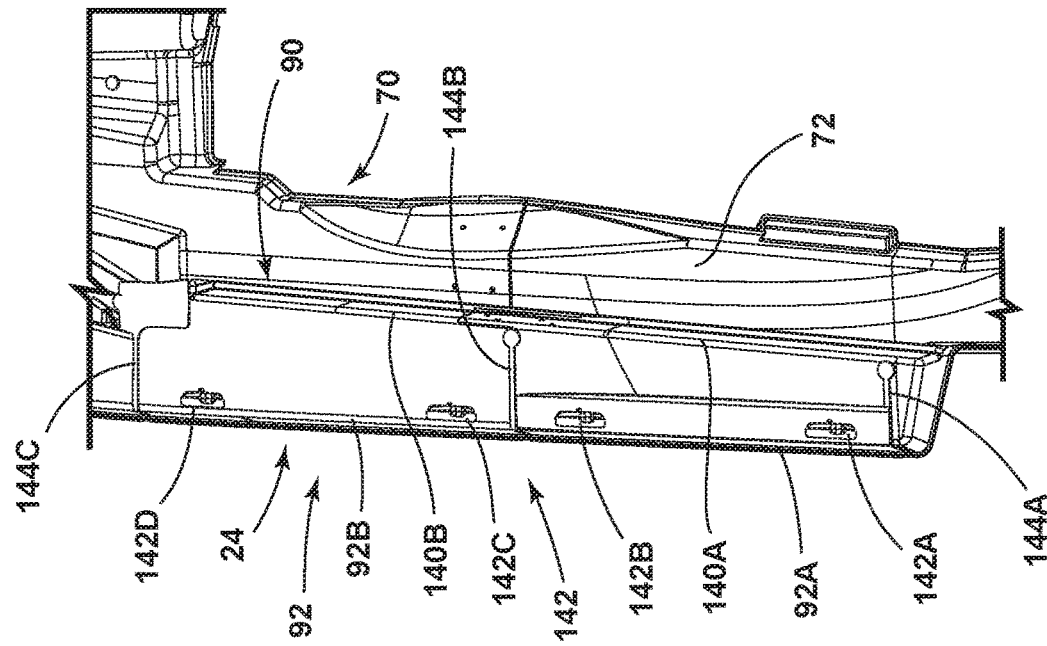
FIG. 4A is a fragmentary front perspective view of the front carrier module of FIG. 3.

Referring now to FIGS. 4A and 4B, the front carrier module 24 is shown with doors 92A, 92B hingedly coupled to the first side member 72. With specific reference to FIG. 4A, the doors 92A, 92B are shown as being pivotally coupled to the outer perimeter edge 90 of the mounting portion 70 of the front carrier module 24 at respective living hinges 140A, 140B. The living hinges 140A, 140B are contemplated to be portions of thinned material disposed between the mounting portion 70 and the doors 92A, 92B of the front carrier module 24 that allow for the doors 92A, 92B to pivot along a first pivot axis PA1 (FIG. 5). It is contemplated that the front carrier module 24 is comprised of an injection molded polymeric material that is flexibly resilient to allow for the doors 92A, 92B to pivot along the associated living hinges 140A, 140B. Living hinge 140 is shown in FIG. 10 as a substantially continuous living hinge extending around the outer perimeter edge 90 of the mounting portion 70 of the front carrier module 24 for pivotally connecting each door 92A-92l with the mounting portion 70. With further reference to FIG. 4A, the front carrier module 24 includes a plurality of receiving slots 142 disposed on the plurality of doors 92. The clip members 134A-134P of the plurality of clip members 134 of the back panel 28 (FIG. 3) are received through the associated receiving slots 142A-142P (FIG. 5) of plurality of receiving slots 142 to releasably retain the doors 92A-92l of the plurality of doors 92 in the closed position, as further described below.

As further shown in FIG. 4A, door 92A includes first and second receiving slots 142A, 142B, and door 92B also includes first and second receiving slots 142C, 142D. Thus, the doors 92A-92l of the plurality of doors 92 may include one or more receiving slots disposed therethrough. With further reference to FIG. 4A, the doors 92A and 92B are separated by gaps 144A-144C from adjacent doors and components of the front carrier module 24, such that the doors 92A, 92B can act independently of one another and moving between open and closed positions. The doors 92A, 92B shown in FIGS. 4A, 4B are exemplary embodiments of the doors 92A-92l of the plurality of doors 92, such that features of the doors 92A, 92B further describes features of the remaining doors 92C-92l, unless specifically noted otherwise.

Referring now to FIG. 4B, the doors 92A, 92B include respective engagement members 146A, 146B and 146C, 146D. The engagement members 146A-146D are part of a plurality of engagement members 146 shown in the form of clip members rearwardly extending from the doors 92A, 92B. In the embodiment shown in FIG. 4B, the engagement members 146A-146D are each disposed adjacent to associated receiving slots 142A-142D. The engagement members 146A-146D are exemplary embodiments of engagement members that surround the front carrier module 24 on the plurality of doors 92 disposed along and pivotally coupled to the outer perimeter edge 90 of the mounting portion 70 of the front carrier module 24. In use, the plurality of engagement members 146 couple to the plurality of receiving apertures 126 disposed along the front edge 128 of the raceway 100 of the airbag carrier module 26 to retain each door 92A-92l of the plurality of doors 92 of the front carrier module 24 in a closed position.

Figure 5B:
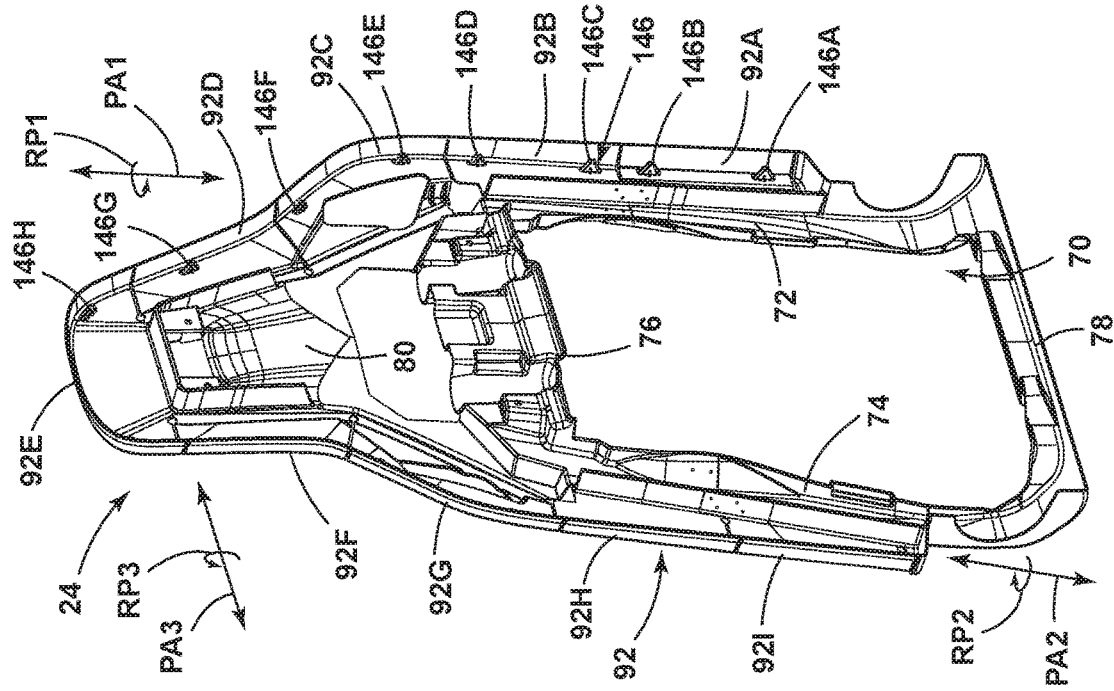
FIG. 5B is a rear perspective view of the front carrier module of FIG. 5A.
Figure 5A:
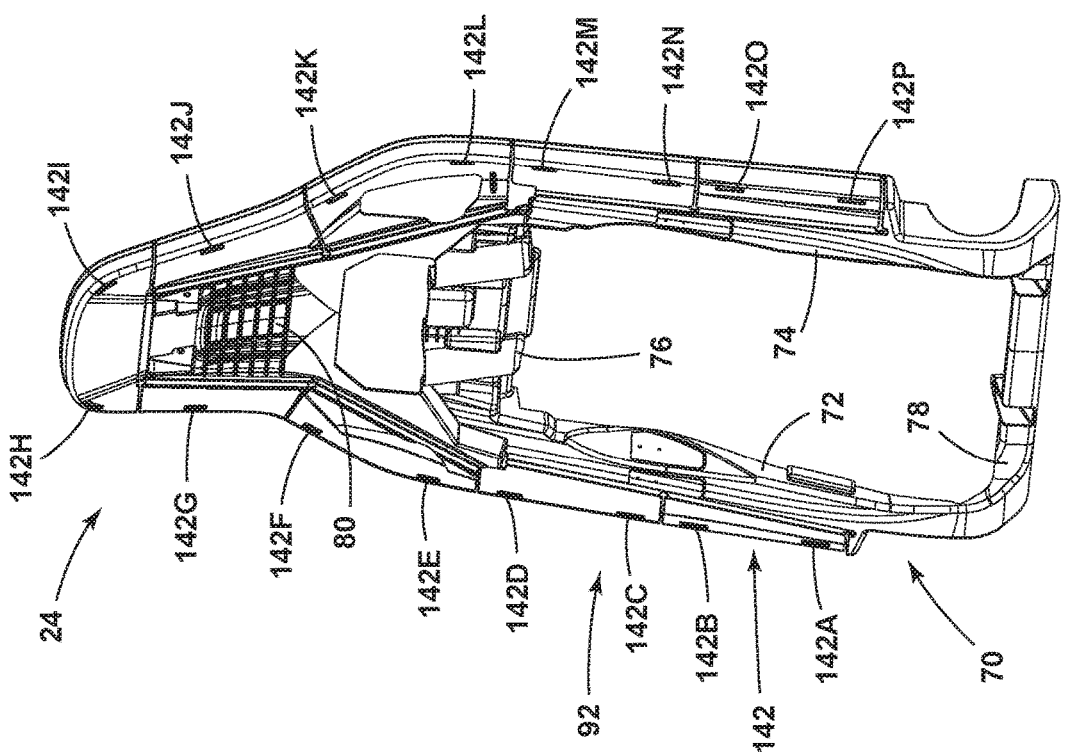
FIG. 5A is a front perspective view of the front carrier module of FIG. 3.

Referring now to FIG. 5A, the front carrier module 24 is shown having the plurality of doors 92 with a plurality of receiving slots 142 disposed therethrough. The plurality of receiving slots 142 includes receiving slots 142A-142P spaced-apart along doors 92A-92l. As such, each door 92A-92l of the plurality of doors 92 includes at least one receiving slot of the plurality of receiving slots 142.

Referring now to FIG. 5B, the front carrier module 24 is shown having the plurality of engagement members 146 comprised of individual engagement members 146A-146H shown in the embodiment of FIG. 5B. It is contemplated that more engagement members are disposed on doors 92E-92l that cannot be seen in the view of the front carrier module 24 in FIG. 5B. As further illustrated in FIG. 5B, the first side member 72 of the front carrier module 24 includes doors 92A, 92B coupled to the outer perimeter edge 72A (FIG. 3) of the first side member 72. The doors 92A, 92B are operable between open and closed positions relative to the first side member 72 and are configured to rotate on a first pivot axis PA1 along a first rotational path RP1. The second side member 74 of the front carrier module 24 is spaced-apart from the first side member 72 and includes doors 92l, 92H coupled to the outer perimeter edge 74A (FIG. 3) of the second side member 74. The doors 92l, 92H are operable between open and closed positions relative to the second side member 74 and are configured to rotate on a second pivot axis PA2 along a second rotational path RP2. The first rotational path RP1 is an inward rotation towards the first side member 72 for doors 92A, 92B. The second rotational path RP2 is an inward rotation towards the second side member 74 for doors 92l, 92H. Thus, as shown in FIG. 5B, the first pivot axis PA1 and the second pivot axis PA2 are substantially upright axes having opposed rotational paths RP1, RP2, respectively. The first and second pivot axes PA1, PA2 may also be substantially parallel to one another, or may include an outwardly tapered configuration from top to bottom. The rotational paths RP1, RP2 are considered opposed in that the doors disposed on the respective rotational paths rotate in opposite directions relative to one another.

As further shown in FIG. 5B, the support member 80 is positioned above and operably coupled to both the first and second side members 72, 74 of the front carrier module 24. The support member 80 includes an outer perimeter edge 80A (FIG. 3) having first and second side edges 82, 84 and an upper edge 86. As noted above, the support member 80 includes door 92E that is hingedly coupled to the upper edge 86 of the outer perimeter edge 80A of the support member 80. The door 92E of the support member 80 folds downwardly along a third pivot axis PA3 from the closed position to the open position (FIG. 10) along a third rotational path RP3. The downward rotational movement of the door 92E provides for a pivot access (PA3) that is substantially perpendicular to the first and second pivot axes (PA1, PA2) of the first and second side members 72, 74 of the front carrier module 24.

Figure 6:
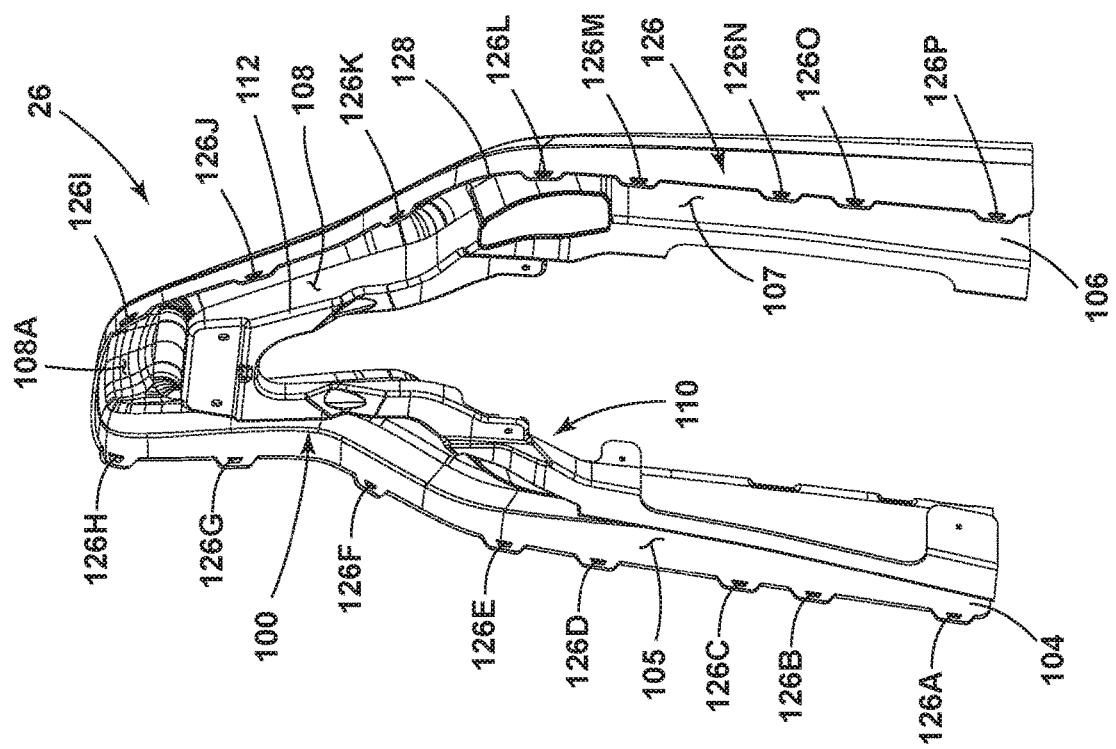
FIG. 6 is a front perspective view of the airbag carrier module of FIG. 3.

Referring now to FIG. 6, the airbag carrier module 26 includes a plurality of receiving apertures 126 disposed along the front edge 128 of the raceway 100. The plurality of receiving apertures 126 includes receiving apertures 126A-126P disposed along the front edge 128 of the raceway 100. The plurality of receiving apertures 126 is contemplated to coincide with the plurality of engagement members 146 (FIG. 5B) disposed on the front carrier module 24. Thus, the plurality of engagement members 146 are received in associated receiving apertures of the plurality of receiving apertures 126 to retain each door 92A-92I of the plurality of doors 92 in the closed position. This engagement is best shown in FIGS. 8A and 8B.

With specific reference to FIGS. 3, 5A, 5B and 6, the front carrier module 24 includes the plurality of doors 92 (FIG. 3) comprised of doors 92A-92I. The front carrier module 24 further includes the plurality of receiving slots 142 (FIG. 5A) comprised of receiving slots 142A-142P disposed through the doors 92A-92I. The front carrier module 24 further includes the plurality of engagement members 146 (FIG. 5B) comprised of engagement members 146A-146H (with others not shown in FIG. 5B). The airbag carrier module 26 includes the plurality of receiving apertures 126 comprised of receiving apertures 126A-126P (FIG. 6). Finally, the back panel 28 includes the plurality of clip members 134 comprised of clip members 134A-134P (FIG. 3). It is contemplated that the seatback assembly 18 of the present concept may include any number of doors and associated receiving apertures, clip members, engagement members and receiving slots to releasably retain the doors in the closed positions. With regards to the engagement of the doors 92A-92I with the airbag carrier module 26 and the back panel 28, the term "associated" is used to describe engagement features (such as the receiving apertures, clip members, engagement members and receiving slots disclosed herein) that are engaged with one another.

Figure 7:
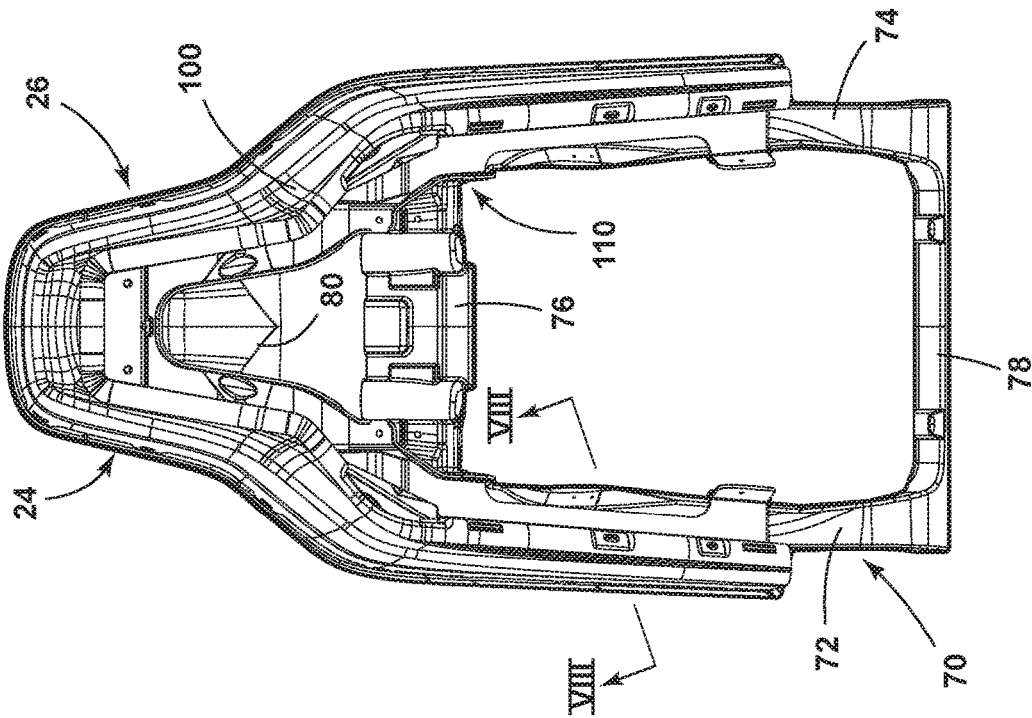
FIG. 7 is a rear elevation view of the front carrier module of FIG. 3 coupled to the airbag carrier module of FIG. 3.

Referring now to FIG. 7, the front carrier module 24 is shown coupled to the airbag carrier module 26 at the respective mounting portions 70, 110.

Figure 8A:
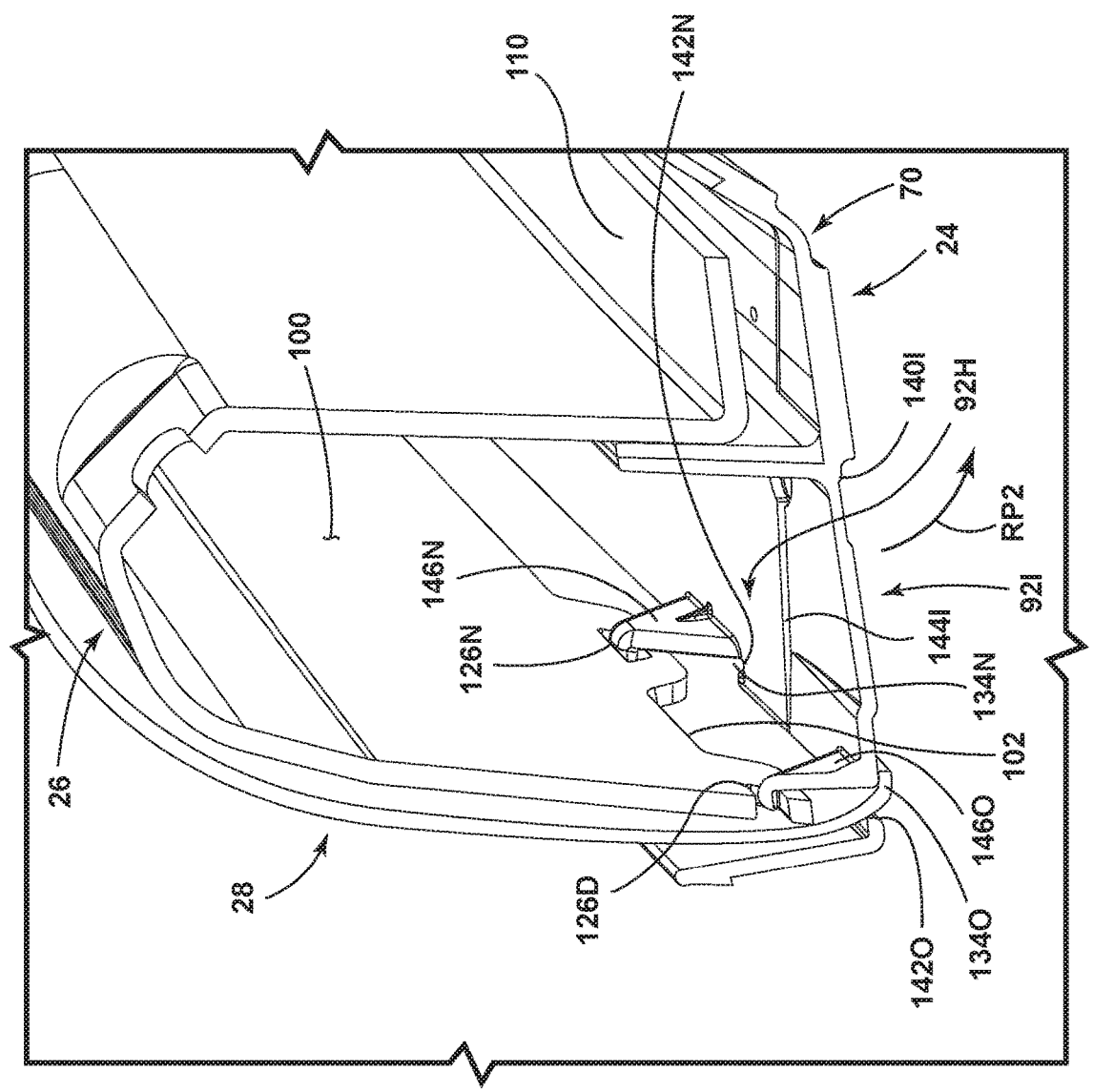
FIG. 8A is a cross-sectional bottom perspective view of the front carrier module and the airbag carrier module of FIG. 7 taken at line VIII and having the back panel of FIG. 3 coupled thereto.
Figure 8B:
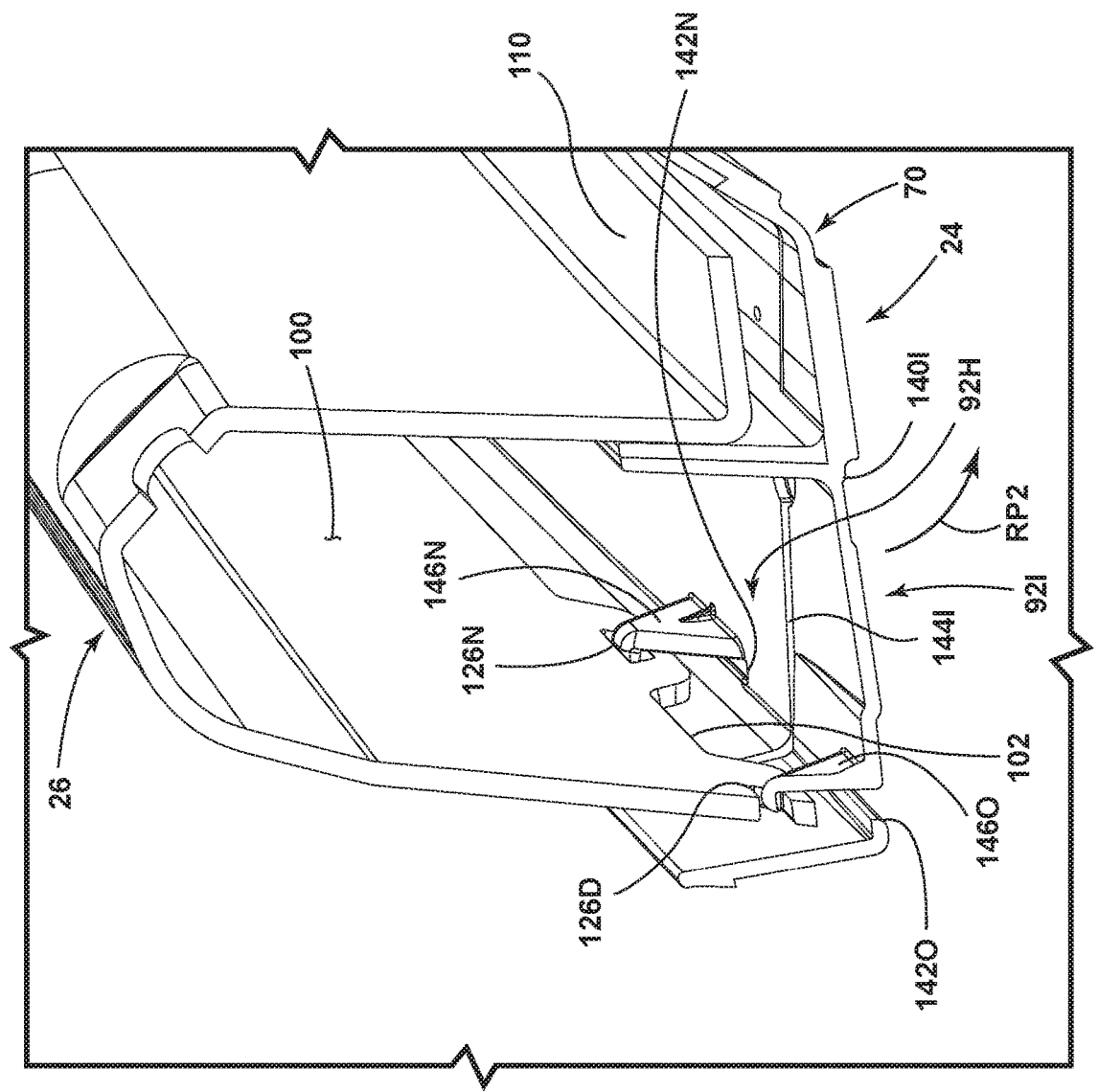
FIG. 8B is a cross-sectional bottom perspective view of the front carrier module and the airbag carrier module of FIG. 7 taken at line VIII.
Figure 8C:
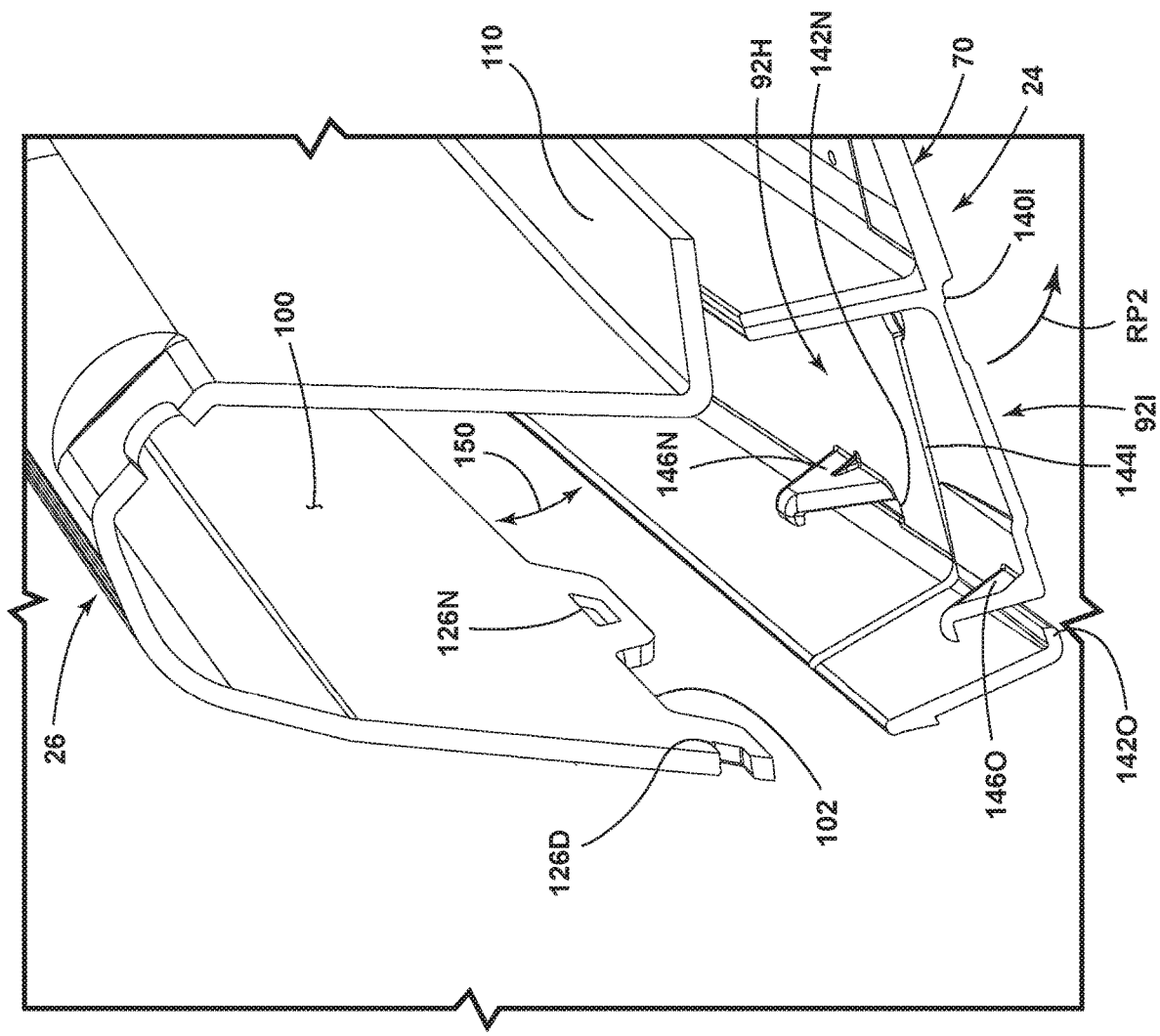
FIG. 8C is a cross-sectional bottom perspective view of the front carrier module and the airbag carrier module of FIG. 7 taken at line VIII with doors of the front carrier module shown in open positions.

Referring now to FIG. 8A, the back panel 28 is shown coupled to the front carrier module 24 at door 92I. Specifically, clip members 134N and 134O of the back panel 28 are shown as being received through the associated receiving slots 142N, 142O, respectively, of the front carrier module 24 at door 92I. As shown in FIGS. 8A and 8B, the engagement members 146N and 146O of the door 92I are received through the associated receiving apertures 126N and 126O, respectively, of the airbag carrier module 26. In this way, the door 92I is retained in a closed position, thereby closing the open front portion 102 of the raceway 100 of the airbag carrier module 26. The door 92I is configured to rotate along the second rotational path RP2 towards the mounting portion 70 of the front carrier module 24 to move from the closed position (FIGS. 8A, 8B) to the open position (FIG. 8C) via the living hinge portion 140I. In the open position shown in FIG. 8C, the door 92I is spaced-apart from the back panel 28 to define a gap 150 therebetween, through which an airbag assembly may deploy.

Referring now to FIG. 9, the front carrier module 24 is shown coupled to the airbag carrier module 26 with the plurality of doors 92 shown in the closed position. As further shown in FIG. 10, door 92E further includes deformable corner portions 94, 96 disposed on opposite sides of the door 92E which may fold inwardly towards one another during deployment of an airbag assembly along living hinge portions 94A, 96A, respectively.

Referring now to FIG. 10, the doors 92A-92I of the plurality of doors 92 are shown in open positions, thereby providing access to the raceway 100 of the airbag carrier module 26. The doors 92A-92I of the plurality of doors 92 are configured to selectively open and close the open front portion 102 of the raceway 100 of the airbag carrier module 26. The doors 92A-92I of the plurality of doors 92 may operate independently of each other and are generally configured to deploy along a deployment path under a force imparted by the deploying airbag assembly. An airbag assembly, such as airbag assembly 50 shown in FIGS. 2, 3, 12A and 12B, is contemplated to include dual inflator mechanisms generally disposed adjacent to doors 92B and 92H on the opposed first and second side member 72, 74 of the front carrier module 24. Thus, doors 92B and 92H are contemplated to be the first doors to open of the plurality of doors 92 during the deployment of an airbag assembly. The deployment paths DP1 and DP2 are shown as extending upwardly and downwardly on the respective sides of the front carrier module 24, until the uppermost door 92E is reached. As shown in FIG. 10, the doors 92A-92D and the doors 92F-92I rotate inwardly towards one another when moving from the closed position (FIG. 9) to the open position (FIG. 10) along the respective rotational paths RP1, RP2. Door 92E folds downwardly towards an outer surface of the support member 80 when moving from the closed position to the open position along rotational path RP3.

Referring now to FIGS. 11A and 11B, a seat occupant 210 is shown seated on the seat assembly 10. In FIGS. 11A and 11B, the airbag assembly 50 is shown in the deployed position. With the airbag assembly 50 being and overhead airbag assembly disposed around the seatback assembly 18, the airbag assembly 50 is configured to deploy outwardly, along the path as indicated by arrow 212, to move over the seat occupant 210 and surround the seat occupant 210 in the deployed position, as shown in FIGS. 11A and 11B.

Figure 12A:
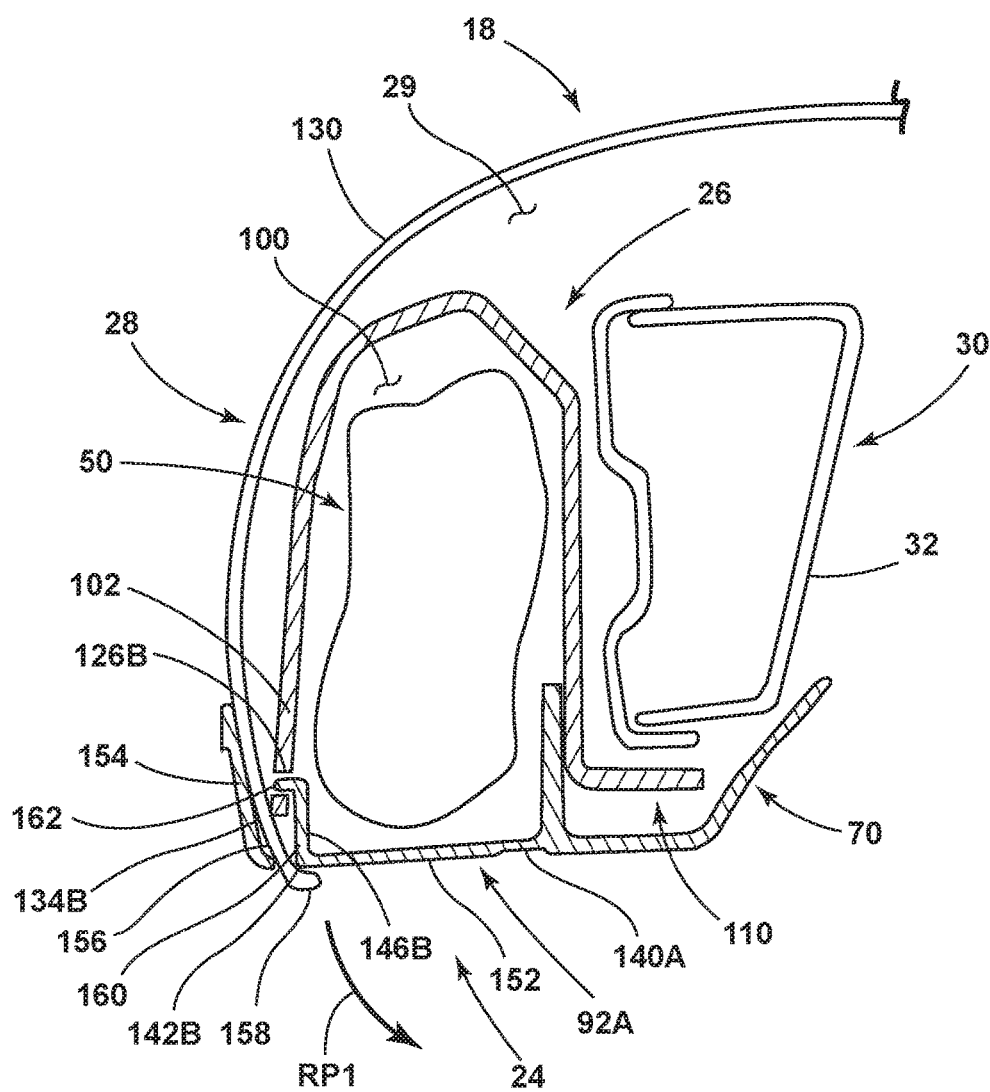
FIG. 12A is a cross-sectional view of the front carrier module and airbag carrier module of FIG. 9 taken at line XII as coupled to the back panel and the seatback frame of FIG. 3 with the airbag assembly of FIG. 3 shown in a stowed position.

Referring now to FIG. 12A, the airbag assembly 50 is shown disposed within the raceway 100 of the airbag carrier module 26 in a stowed positon. As specifically shown in FIG. 12A, the door 92A includes a first portion 152 outwardly extending from the living hinge portion 140A. In use, the first portion 152 of the door 92A covers the open front portion 102 of the raceway 100, and retains the airbag assembly 50 within the raceway 100. The door 92A further includes a second portion 154 that extends orthogonally in a rearward direction relative to the first portion 152 of the door 92A. It is contemplated that each door (92A-92I) of the plurality of doors 92 of the front carrier module 24 includes a first portion and a second portion provided in a configuration similar to that shown in FIG. 12A.

Figure 12B:
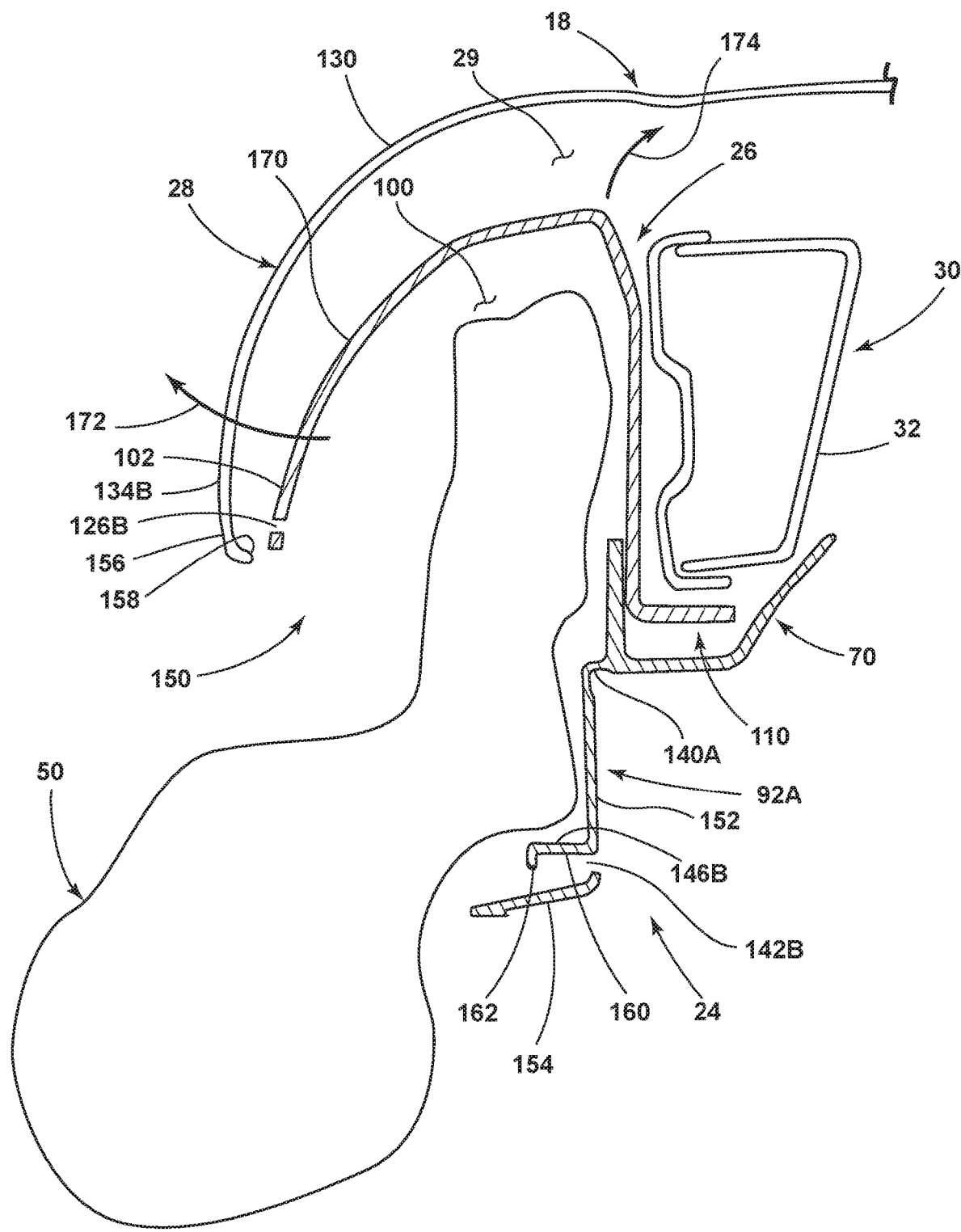
FIG. 12B is a cross-sectional view of the front carrier module and airbag carrier module of FIG. 12A showing the airbag assembly in the deployed position.

As further shown in FIG. 12A, the clip member 134B of the back panel 28 includes an outwardly extending portion 156 and an inwardly extending portion 158. The outwardly extending portion 156 of the clip member 134B is received through the receiving slot 142B of the door 92A. The inwardly extending portion 158 of the clip member 134B of the back panel 28 is shown disposed along an outer surface of the first portion 152 of the door 92A. In this way, the clip member 134B of the back panel 28 retains the door 92A in the closed position. As further shown in FIG. 12A, the engagement member 146B of the front carrier module 24 includes a rearwardly extending first portion 160 and an outwardly extending second portion 162. The outwardly extending second portion 162 of the engagement member 146B of the front carrier module 24 is shown received within the receiving aperture 126B of the airbag carrier module 26. In this way, the door 92A is releasably retained in the closed position by the interconnection of the door 92A with the back panel 28 and the airbag carrier module 26. Under an outwardly imparted force, the door 92A is configured to release from the back panel 28 and the airbag carrier module 26 to move to an open position as shown in FIG. 12B as the airbag assembly 50 deploys. Thus, from FIG. 12A to FIG. 12B, the door 92A has pivoted along the first rotational path RP1 as indicated in FIG. 12A. During deployment of the airbag assembly 50, the raceway 100 of the airbag carrier module 26 serves as a reaction surface for the airbag assembly 50. As further shown in FIG. 12B, the opening of the door 92A provides for the gap 150 between the back panel 28 and the front carrier module 24.

As further shown in FIGS. 12A and 12B, the mounting portions 70, 110 of the front carrier module 24 and the airbag carrier module 26 are contemplated to be mounted to the seatback frame 30 at the first side member 32 thereof. In this way, the front carrier module 24 and the airbag carrier module 26 are fixedly coupled to and supported by the seatback frame 30. It is further contemplated that the airbag assembly 50 may include a plurality of straps for mounting a portion of the airbag assembly 50 to the seatback frame 30. Such a configuration of mounting the airbag assembly 50 to the seatback frame 30 provides for a reinforcing configuration against a seat occupant whom can impart a forwardly directed force on the airbag assembly 50 after the airbag assembly 50 has been deployed by redirecting forces to the seatback frame 30.

As noted above, the airbag assembly 50 imparts the force necessary to uncouple the engagement members 146 of the plurality of doors 92 of the front carrier module 24 from the plurality of receiving apertures 126 of the airbag carrier module 26 and the plurality of clip members 134 of the back panel 28. The airbag carrier module 26 is contemplated to be comprised of a flexible or flexibly resilient material, such as a polymeric injection molded part. In this way, a perimeter wall 170 of the raceway 100 flexes outward radially, in the direction as indicated by arrow 172, during the deployment of the airbag assembly 50. Further, the raceway 100 of the airbag carrier module 26 itself flexes rearwardly along the radial path indicated by arrow 174 during the deployment of the airbag assembly 50. Thus, as a reactionary surface for the airbag assembly 50, the open u-shaped raceway 100 of the airbag carrier module 26 moves away from the doors 92 of the front carrier module 24 and away from the back panel 28 under a deployment force of the airbag assembly 50. This motion aids in uncoupling the clip members 134 of the back panel 28 from the doors 92 of the front carrier module 24 and also aids in uncoupling the engagement members 146 of the doors 92 from the receiving apertures 126 of the open front portion 102 of the airbag carrier module 26. The body portion 130 of the back panel 28 may also flex outwardly along the path indicated by arrow 172 to further assist the uncoupling of the back panel 28 from the doors 92 of the front carrier module 24.

According to one aspect of the present invention, a seatback assembly includes a front carrier module having a mounting portion with an inverted U-shaped outer perimeter edge and a plurality of doors hingedly coupled to the outer perimeter edge. Each door of the plurality of doors is operable between open and closed positions. An airbag carrier module includes an inverted U-shaped raceway with an open front portion. The doors of the plurality of doors selectively open and close the open front portion of the raceway of the airbag carrier module.

Embodiments of the first aspect of the invention can include any one or a combination of the following features:

the plurality of doors includes a plurality of engagement members;

the airbag carrier module includes a plurality of receiving apertures disposed along a front edge of the raceway;

the engagement members of the plurality of engagement members are received in associated receiving apertures of the plurality of receiving apertures to retain each door of the plurality of doors in the closed position;

the plurality of doors are hingedly coupled to the outer perimeter edge of the front carrier module by living hinges;

each door of the plurality of doors includes a first portion outwardly extending from the living hinges, and a second portion extending orthogonally from the first portion;

a back panel having a plurality of clip members disposed along a front edge of the back panel;

the front carrier module includes a plurality of receiving slots disposed on one or more of the doors of the plurality of doors, wherein the clip members of the plurality of clip members of the back panel are received through the receiving slots of the plurality of receiving slots to releasably retain the one or more doors of the plurality of doors in the closed position;

the raceway includes a body portion having first and second ends and first and second upwardly extending portions which respectively extend upwardly from first and second ends, and further wherein the body portion of the raceway includes an upper transverse portion which interconnects the first and second upwardly extending portions of the body portion of the raceway;

an airbag assembly, wherein the airbag assembly is an elongate airbag assembly having first and second ends with a body portion disposed therebetween, and further wherein the first and second ends of the airbag assembly are received in the first and second ends of the raceway; and the body portion of the airbag assembly is substantially received along an entirety of the body portion of the raceway.

According to another aspect of the present invention, a front carrier module for a seatback assembly includes a first side member having at least one door hingedly coupled to an outer perimeter edge of the first side member. The at least one door of the first side member is operable between open and closed positions relative to the first side member. A second side member is spaced-apart from the first side member and includes at least one door hingedly coupled to an outer perimeter edge of the second side member. The at least one door of the second side member is operable between open and closed positions relative to the second side member. A support member is positioned above and operably coupled to both the first and second side members. The support member includes an outer perimeter edge having first and second side edges and an upper edge. The support member includes at least one door hingedly coupled to the upper edge of the outer perimeter edge of the support member.

Embodiments of the second aspect of the invention can include any one or a combination of the following features:

the at least one door of the first side member folds inwardly along a first pivot axis from the closed position to the open position along a first rotational path;

the at least one door of the upper edge of the outer perimeter edge of the support member folds downwardly along a second pivot axis from the closed position to the open position along a second rotational path;

the second pivot axis is substantially perpendicular to the first pivot axis;

the at least one door of the second side member folds inwardly along a second pivot axis from the closed position to the open position along a second rotational path;

the first pivot axis and the second pivot axis are substantially upright axes; and the first rotational path and the second rotational path are opposed rotational paths.

According to yet another aspect of the present invention, a seatback assembly includes a front carrier module having a mounting portion with an outer perimeter edge and a plurality of doors hingedly coupled to and outwardly extending from the outer perimeter edge of the mounting portion. Each door of the plurality of doors is independently operable between open and closed positions. Each door of the plurality of doors includes an engagement member. An airbag carrier module includes a mounting portion with an outer perimeter edge and a raceway disposed along and outwardly extending from the outer perimeter edge of the mounting portion of the airbag carrier module. The raceway includes a front edge having a plurality of engagement members. At least one engagement member of the plurality of engagement members of the raceway releasably engages an associated engagement member of each door of the plurality of doors of the front carrier module to releasably retain each door of the plurality of doors of the front carrier module in a closed position.

Embodiments of the third aspect of the invention can include any one or a combination of the following features:

each door of the plurality of doors of the front carrier module selectively provides access to the raceway in the open position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback assembly, comprising:
a front carrier module having a mounting portion with an inverted U-shaped outer perimeter edge and a plurality of doors hingedly coupled to the outer perimeter edge, wherein each door of the plurality of doors is operable between open and closed positions; and
an airbag carrier module having an inverted U-shaped raceway with an open front portion, wherein the doors of the plurality of doors selectively open and close the open front portion of the raceway.

2. The seatback assembly of claim 1, wherein the plurality of doors includes a plurality of engagement members.

3. The seatback assembly of claim 2, wherein the airbag carrier module includes a plurality of receiving apertures disposed along a front edge of the raceway.

4. The seatback assembly of claim 3, wherein the engagement members of the plurality of engagement members are received in associated receiving apertures of the plurality of receiving apertures to retain each door of the plurality of doors in the closed position.

5. The seatback assembly of claim 1, wherein the plurality of doors are hingedly coupled to the outer perimeter edge of the front carrier module by living hinges.

6. The seatback assembly of claim 5, wherein each door of the plurality of doors includes a first portion outwardly extending from the living hinges, and a second portion extending orthogonally from the first portion.

7. The seatback assembly of claim 1, including:
a back panel having a plurality of clip members disposed along a front edge of the back panel.

8. The seatback assembly of claim 7, wherein the front carrier module includes a plurality of receiving slots disposed on one or more of the doors of the plurality of doors, wherein the clip members of the plurality of clip members of the back panel are received through the receiving slots of the plurality of receiving slots to releasably retain the one or more doors of the plurality of doors in the closed position.

9. The seatback assembly of claim 1, wherein the raceway includes a body portion having first and second ends and first and second upwardly extending portions which respectively extend upwardly from first and second ends, and further wherein the body portion of the raceway includes an upper transverse portion which interconnects the first and second upwardly extending portions of the body portion of the raceway.

10. The seatback assembly of claim 9, including:
an airbag assembly, wherein the airbag assembly is an elongate airbag assembly having first and second ends with a body portion disposed therebetween, and further wherein the first and second ends of the airbag assembly are received in the first and second ends of the raceway.

11. The seatback assembly of claim 10, wherein the body portion of the airbag assembly is substantially received along an entirety of the body portion of the raceway.

12. A front carrier module for a seatback assembly, comprising:
a first side member having at least one door hingedly coupled to an outer perimeter edge of the first side member, wherein the at least one door of the first side member is operable between open and closed positions relative to the first side member, and further wherein the at least one door of the first side member folds inwardly along a first pivot axis from the closed position to the open position along a first rotational path;
a second side member spaced-apart from the first side member and having at least one door hingedly coupled to an outer perimeter edge of the second side member, wherein the at least one door of the second side member is operable between open and closed positions relative to the second side member; and
a support member positioned above and operably coupled to both the first and second side members, wherein the support member includes an outer perimeter edge having first and second side edges and an upper edge, and further wherein the support member includes at least one door hingedly coupled to the upper edge of the outer perimeter edge of the support member.

13. The front carrier module of claim 12, wherein the at least one door of the upper edge of the outer perimeter edge of the support member folds downwardly along a second pivot axis from the closed position to the open position along a second rotational path.

14. The front carrier module of claim 13, wherein the second pivot axis is substantially perpendicular to the first pivot axis.

15. The front carrier module of claim 12, wherein the at least one door of the second side member folds inwardly along a second pivot axis from the closed position to the open position along a second rotational path.

16. The front carrier module of claim 15, wherein the first pivot axis and the second pivot axis are substantially upright axes.

17. The front carrier module of claim 15, wherein the first rotational path and the second rotational path are opposed rotational paths.

18. A seatback assembly, comprising:
- a front carrier module having a mounting portion with an outer perimeter edge and a plurality of doors hingedly coupled to and outwardly extending from the outer perimeter edge of the mounting portion, wherein each door of the plurality of doors is independently operable between open and closed positions, and further wherein each door of the plurality of doors includes an engagement member; and
- an airbag carrier module having a mounting portion with an outer perimeter edge and a raceway disposed along and outwardly extending from the outer perimeter edge of the mounting portion of the airbag carrier module, wherein the raceway includes a front edge having a plurality of engagement members, and further wherein at least one engagement member of the plurality of engagement members of the raceway releasably engages an associated engagement member of each door of the plurality of doors of the front carrier module to releasably retain each door of the plurality of doors of the front carrier module in a closed position.

19. The seatback assembly of claim 18, wherein each door of the plurality of doors of the front carrier module selectively provides access to the raceway in the open position.

* * * * *